June 5, 1934.   H. A. WADMAN ET AL   1,961,893
AUTOMATIC LEVEL CONTROL SYSTEM
Filed July 26, 1933   2 Sheets-Sheet 1
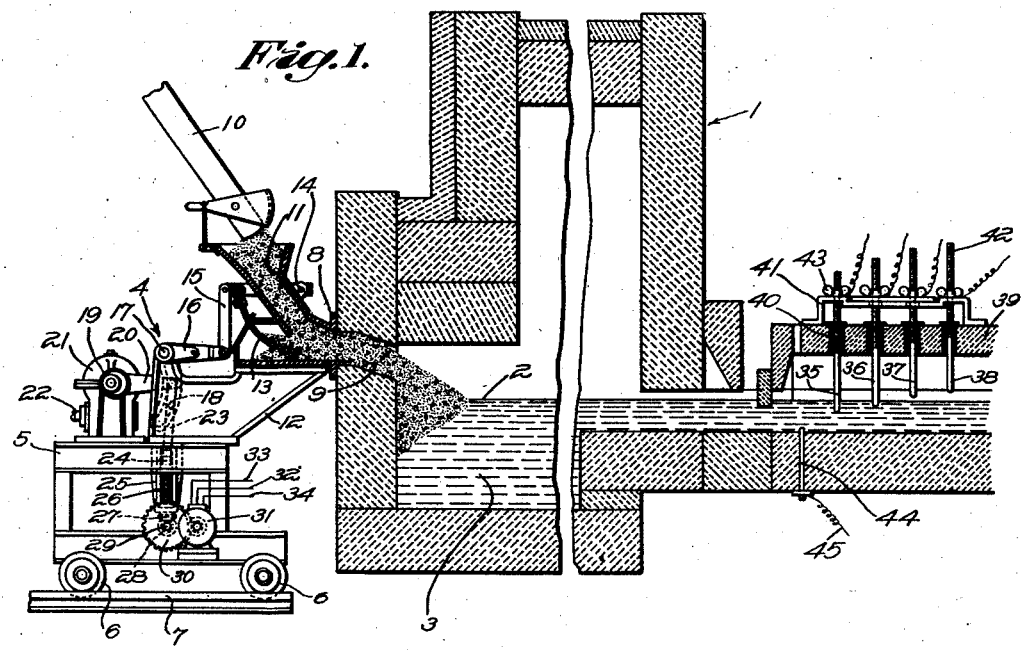
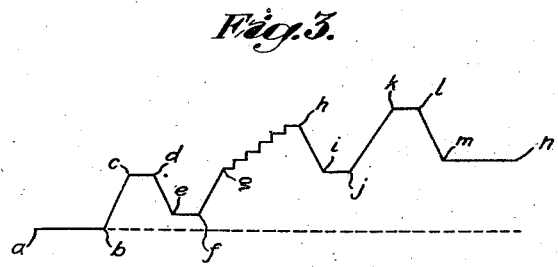
Witness;
W. B. Thayer.
Inventors;
Harold A. Wadman
Harold W. McIntosh
by Brown & Packard
Attorneys

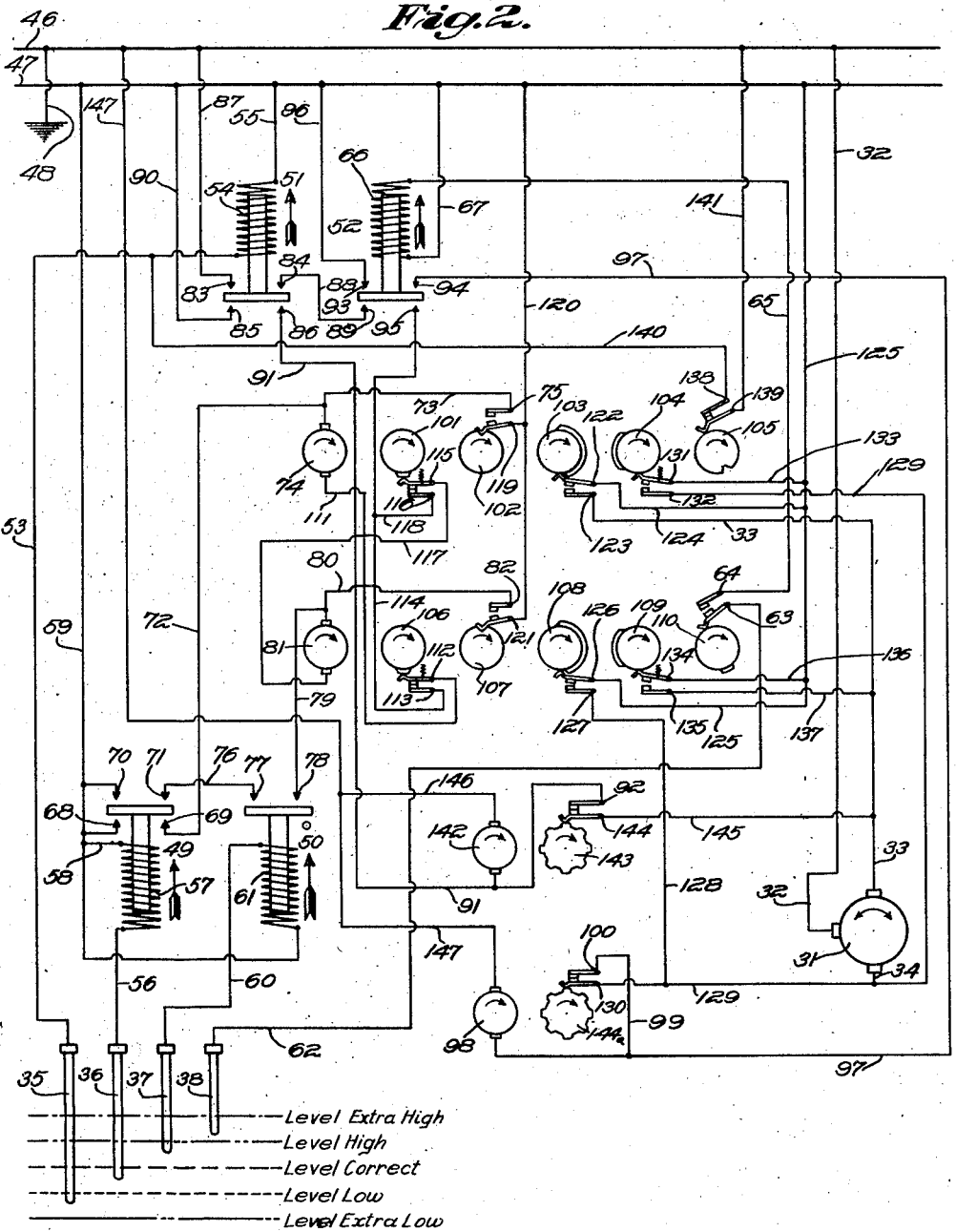

Patented June 5, 1934

1,961,893

UNITED STATES PATENT OFFICE 1,961,893

AUTOMATIC LEVEL CONTROL SYSTEM

Harold A. Wadman, West Hartford, and Harold W. McIntosh, Windsor, Conn., assignors to Hartford-Empire Company, Hartford, Conn., a corporation of Delaware Application July 26, 1933, Serial No. 682,182

9 Claims. (Cl. 49—54)

This invention relates to a system of automatically controlling the level of a bath of electrolytic liquid which is adapted to be drawn off at different rates from time to time and which is adapted to be substantially continuously supplied with either the material of the bath itself or materials which will form the material of the bath.

As such our invention is particularly adaptable for use in connection with the control of the level of tank furnaces for melting glass, although it is to be understood that the principles thereof are applicable not only to this type of device, but also to other glass containing vessels subject to the same or similar possible variations in level and also to containers for holding other liquids which may vary in level and in which it is desired to maintain a constant level.

In many of the uses to which glass is put, it is highly desirable, if not absolutely essential, to maintain a constant predetermined level of glass in the furnace. In many cases also, furnaces of this type are subject to both small and large changes in the rate of pull or glass withdrawal therefrom. The old practice has been to charge a relatively large supply of glass making materials to these furnaces at intermittent intervals. More recently continuous batch feeders have been invented for substantially continuously supplying glass making materials to the furnace. One of the most highly improved types of such batch feeders is illustrated and described in the patent granted to Everett O. Hiller, No. 1,941,897, granted January 2, 1934. This batch feeder is provided with means for varying the rate of batch feed to the furnace. However, it has been found in the past that any manual and most attempted automatic controls of level have not in fact maintained the level within the desired limits without frequent changes in one direction or the other, which are slow to be corrected and in the correction of which a material time is consumed, due to the level wandering first to one side and then to the other of the desired point, this condition being known as "hunting".

An object of the present invention, therefore, is to provide an automatic level control system adapted for use in glass furnaces and other possible uses, as above suggested, and especially effective quickly to correct irregularities in and undesirable variations of the level.

A further and more specific object of the present invention is to provide an automatic level control or regulation system such that the level will be corrected first to compensate for the difference between the actual level which initiates the operation of the control system and the desired level, and, second, to compensate for the difference between the rate of material supply to the bath prior to the existence of the condition causing the level to change from the desired point and the new rate at which material must be supplied in order to maintain the level under the new conditions.

A further object of the invention is to provide other means in connection with the aforesaid means for quickly correcting extreme differences between the existing level and that desired.

Further objects and advantages of our present invention will become apparent from a reading of the following specification and appended claims when taken in conjunction with the accompanying drawings, in which:

Fig. 1 is a somewhat diagrammatic view principally in vertical section of a portion of a glass melting tank with a feeding device for glass making materials or batch associated therewith and showing also a series of level responsive electrodes extending downwardly through the roof of a portion of the furnace toward the glass;

Fig. 2 is a wiring diagram of the control system, certain of the operating means being shown diagrammatically; and Fig. 3 is a chart showing the type of control effected by the automatic system when in operation.

Referring first to Fig. 1, there is illustrated at 1 in a diagrammatic manner a melting furnace for glass, the level of which it is desired to maintain at a point indicated at 2. The glass bath 3 in the tank 1 may be withdrawn for use in any desired manner, the manner or manners of use forming no part of the present invention and hence not being particularly illustrated or described herein.

There is indicated generally at 4 a feeding device for supplying glass making materials or batch to the interior of the tank 1, the device 4 being substantially that shown and described in the Hiller patent above referred to. As illustrated, the device 4 comprises a supporting table structure 5 mounted upon wheels 6 which are adapted to roll upon rails 7 suitably positioned adjacent to the feeding end of the furnace 1. The device 4 is provided with a discharge portion 8 adapted to be positioned contiguous to and in registry with an aperture 9 in the sidewall of the furnace preferably above the normal level of the glass therein. Glass making materials or batch may be supplied through the chute 10 to the hopperlike structure 11 which is supported by a suitable bracket 12 mounted upon the table member 5. The batch is moved inwardly of the furnace through the port opening 9 by a reciprocating plate-like member 13 formed curved, as shown, and arranged for movement about a horizontal pivot 14. A link 15 connects this member with a bell crank 16 pivoted at 17 to a portion of the bracket 12 and having its other arm provided with a curved slot, as indicated in dotted lines at 18. Extending between a desired point along the slot 18 and an eccentric 19 is a link 20 through which motion is imparted from the eccentric to the bell crank and thence through the mechanism described to reciprocate the member 13. The eccentric 19 is rotated through suitable reducing gearing contained within the casing 21 from a drive shaft 22 which may be rotated by any suitable prime mover preferably operating at a constant speed. The parts thus far described will therefore serve substantially continuously to supply glass making materials from the hopper 11 into the inside of the furnace 1 through the port or aperture 9.

Means are provided for varying the rate of supply of batch to the interior of the furnace by the operation of the batch feeding device 4. For this purpose the point of connection of the link 20 and the arm including the slot 18 is variable. The pivot of these two members is pivotally connected to a link 23 which is connected at its lower end to a crosshead 24 mounted for vertical adjustment in suitable guides 25. For adjusting the crosshead 24, it is threaded upon a suitable screw shaft 26 swivelly mounted in suitable bearings and provided at its lower end with a bevel gear 27 meshing with a bevel gear 28 upon the shaft 29, which shaft also carries a gear 30 meshing with a pinion mounted on the shaft of the reversible motor 31. If desired some further speed reducing gearing may be interposed between the shaft 29 and the shaft of motor 31. This motor 31 is of the split field type including a common wire 32, a wire 33 leading to one field for operating the motor in a direction such as to increase the rate of feed of the glass making materials and a wire 34 leading to the terminal of the other field winding for operating the motor in a direction to decrease such rate.

In some suitable portion of the furnace, preferably in a bay somewhat offset from the main path of flow of material therethrough, are located the level responsive means. In this case we prefer to employ a series of electrodes, preferably four in number, which are positioned at progressively different levels. These electrodes are shown at 35, 36, 37 and 38 and as illustrated in Fig. 1 may extend through a portion 39 of the roof of the furnace or roof portion covering the bay wherein the level responsive means are located. As shown, the electrodes extend through suitable bushings, as indicated at 40, in the roof portion 39 and are carried by an insulating bracket 41 suitably secured to the roof portion 39 of the furnace. The electrodes are provided with means for adjusting the positions of their lower ends vertically, such means in the present instance comprising threaded portions 42 on the stems of each of the electrodes on which wing nuts 43 are threaded. As shown, the electrode 35 is positioned a material distance below the surface of the batch and is adapted to be uncovered only upon a material drop in the glass level. The electrode 36 has its lower end positioned but a slight distance below the desired level 2 of the bath and adapted to be out of contact therewith upon a slight lowering of the bath level. The electrode 37 has its lower end positioned above the bath and normally out of contact therewith by substantially the same amount as electrode 36 extends into the glass; and the electrode 38 has its lower end above and normally out of contact with the bath by an amount preferably substantially the same as the amount of penetration of the electrode 35 into the bath. These levels are best illustrated in the lower left-hand corner of the diagram, Fig. 2. The bath is shown as grounded to one side of the power line through a suitable electrode 44 extending through the bottom of the bath in a position preferably adjacent to the location of electrodes 35 to 38 inclusive. This electrode is connected to the ground through a suitable wire 45.

Referring now to Fig. 2, we have illustrated a complete wiring diagram for all the various instrumentalities included in our control system, the instrumentalities themselves being indicated diagrammatically. In this figure, the motor 31 is indicated by a circle including a double-ended arrow to indicate its reversible character. The electrodes 35 to 38 are also indicated as is the ground 44—45 for the bath. The various possible levels of the bath are indicated by several legends and different types of dot and dash lines. In this figure, there is shown line wires 46 and 47, the wire 46 being connected to the ground, as indicated at 48, and thus connecting with the bath through the ground 44—45 therefor. Associated with the electrodes 35 to 38 are relays generally indicated at 49, 50, 51 and 52, the moving elements of these relays when energized moving in the direction of the arrows shown in the drawings. The electrode 35 is connected by a wire 53 with one terminal of the solenoid coil 54 of relay 51, the other terminal of which is connected by the wire 55 with the line 47. The electrode 36 is connected by the wire 56 with one terminal of a solenoid coil 57 of the relay 49, the other terminal of which is connected through the wires 58 and 59 with the line wire 47. The electrode 37 is connected by the wire 60 with one terminal of the solenoid coil 61 of relay 50, the other terminal of which is connected by wire 59 to the line wire 47. Electrode 38 is connected by the wire 62 with one terminal 63 of a cam operated switch, the other terminal 64 of which is connected by wire 65 with one terminal of the solenoid 66 of relay 52, the other terminal of which solenoid is connected by wire 67 with line wire 47.

Relay 49 is provided with two lower contacts 68 and 69 and two upper contacts 70 and 71 adapted to be bridged by the armature of the relay. Contacts 68 and 70 are connected to the wire 59 and thence to the line wire 47. Contact 69 is connected by the wire 72 to wire 73 extending between the unidirectional motor 74 and the switch terminal 75. Contact 71 is connected by wire 76 with upper contact 77 of relay 50. The other upper contact 78 of relay 50 is connected by a wire 79 with a wire 80 connected between one terminal of the unidirectional motor 81 and one of the switch contacts 82 of a cam operated switch.

Relay 51 is provided with two upper contacts 83 and 84 and two lower contacts 85 and 86. Contact 83 is connected by wire 87 with line wire 46. Contact 84 is connected by wire 88 with lower contact 89 of relay 52. Contact 85 is connected by wire 90 with the line wire 47. Contact 86 is connected by wire 91 with switch contact 92 later to be described.

Relay 52 is provided with two upper contacts 93 and 94 and with two lower contacts 89 and 95. Contact 93 is connected by wire 96 with line wire 47. Contact 94 is connected by wire 97 with one terminal of the unidirectional inching motor 98 and also through branch wire 99 with switch contact 100.

Unidirectional motor 74 is arranged to drive the series of cams 101, 102, 103, 104 and 105 through a suitable reducing gear train, these cams all being mounted upon a common shaft in a manner which will be well understood. Unidirectional motor 81 is similarly arranged to drive a series of cams 106, 107, 108, 109 and 110. In operation, the motor 74 and its associated cams 101 to 105 are operated when the level is low to increase the rate of supply of glass making materials or batch and thus to raise the level. Motor 81 and its associated cams 106 to 110 are operated when the level is too high for decreasing the rate of supply of glass making materials or batch to the furnace.

Considering now the connections to motor 74 and the switches operated by its associated cams, the connection to one terminal of the motor 74 has been described. The other terminal of this motor is connected by a wire 111 to one terminal 112 of a switch controlled by cam 106, the other terminal 113 of this switch being connected by a wire 114 to contact 95 of the relay 52.

Cam 101 has a short projection thereon adapted to close a switch to connect contacts 115 and 116. Contact 115 is connected by a wire 117 with the remaining terminal of motor 81 of the other series of cams. Switch contact 116 is connected by a wire 118 with the wire 114.

Cam 102 is provided at one point in its periphery with a notch into which the movable element of an associated switch may fall. This switch is provided with contacts 75 and 119, the connection to contact 75 having been described previously. Contact 119 is connected by a wire 120 with the line wire 47, this wire also connecting to contact 121 of a similar switch operated by cam 107.

Cams 103 and 108 are each provided with a relatively long high portion for maintaining their associated switches closed a relatively large part of their periphery, preferably slightly less than 180°. Cam 103 is adapted to control a switch including contacts 122 and 123. Contact 122 is connected by a wire 124 with a wire 125 connected to line wire 47. Contact 123 is connected by wire 33 to the motor 31. Cam 108 of the lower series of cams as shown in the drawings is adapted to control a switch including contacts 126 and 127. Contact 126 is connected directly to wire 125 above referred to and thence to the line wire 47. Contact 127 is connected by a wire 128 with a wire 129 connected between a switch contact 130 and wire 34 leading to the motor 31.

Cams 104 and 109 have high portions thereon of somewhat less peripheral extent than the high portions of cams 103 and 108 respectively, and are arranged to close their associated switches at a time subsequent to the reopening of the switches controlled by cams 103 and 108 respectively. The switch associated with cam 104 is provided with contacts 131 and 132. Contact 131 is connected by a wire 133 with wire 125. Contact 132 is connected to one terminal of the wire 129. Cam 109 has associated therewith a switch including contacts 134 and 135. Contact 134 is connected by a wire 136 with wire 125 and contact 135 is connected by a wire 137 with wire 33 connecting to the motor 31. Cam 105 is provided at a point substantially opposite the position of its associated switch with a recess adapted to permit the opening of that switch when the cam is rotated to the proper position. The switch associated with this cam has contacts 138 and 139. Contact 138 is connected by a wire 140 with wire 53 and contact 139 is connected by a wire 141 with line wire 46. Cam 110 is provided with a high portion in substantially the same relation to its associated switch as the recess of cam 105 with its switch. The switch associated with cam 110 has contacts 63 and 64, the connections to which have been previously described.

Also included in the control system is a second inching motor 142, similar to the inching motor 98. Associated with the motors 142 and 98 and adapted to be driven thereby at relatively slow speeds are cog-like cam wheels 143 and 144a, each of which has a switch associated therewith adapted to be alternately opened and closed as the wheels are rotated. Associated with the cam wheel 143 is a switch including contacts 92 and 144. The connection to contact 92 has previously been described. Contact 144 is connected by a wire 145 with wire 33 leading to the motor 31. Associated with a similar cam wheel 144a is a switch including contacts 100 and 130, the connection to which have previously been described. The remaining connections to motors 142 and 98 are connected by wires 146 and 147 together and with the line wire 46.

*Operation*

When the glass level is at the desired point, indicated on Fig. 2 by the legend "Level correct", electrodes 35 and 36 are on contact with the bath and through it and the ground, with line wire 46. Under these circumstances the solenoid coils of relays 51 and 49 are energized and these relays are at their extreme position in the direction of the associated arrows. The circuit for energizing the coil of relay 51 is as follows: line wire 46, through wire 48 to the ground, thence through wire 45, electrode 44, the bath, electrode 35, wire 53, solenoid coil 54, and wire 55 to line wire 47. The circuit for energizing relay 49 and thereby connecting contact points 70 and 71 is as follows: from line wire 46, through wire 48 to the ground, thence through wire 45 and electrode 44 to the bath, thence to electrode 36, wire 56, solenoid coil 57, wire 58 and wire 59 to line wire 47. Due to the level being correct, the electrodes 37 and 38 are out of contact with the bath and the solenoids of relays 50 and 52 are deenergized. Cam motors 74, 81, 142 and 98 and main motor 31 are not in operation, so that no change is taking place in the rate of supply of glass making materials to the furnace. The various cams and their associated switches are shown in the positions they occupy when the level of the glass or other liquid is correct.

Assuming now the level of glass falls to the point indicated on the drawings, Fig. 2, by the legend "Level low", thus exposing the lower end of electrode 36 and opening the circuit above described through the solenoid coil of relay 49, allowing this relay to drop to connect contact points 68 and 69. The first operation is the starting of cam motor 74. This circuit is as follows: from line wire 46 through wire 87, contacts 83 and 84 of relay 51, this relay being energized as above set forth so that its armature is raised, wire 88 to contact 89 of relay 52 which is now lowered due to its solenoid being deenergized, as above set forth, contact 95, wire 114, switch contacts 113 and 112, this switch being closed at this time as indicated in the drawings, wire 111, motor 74, a portion of wire 73, wire 72, contacts 69 and 68 of relay 49 which is now deenergized, and wire 59 back to line wire 47.

It will be noted in this connection that cams 101 and 106 have their associated switches connected respectively in series with the motors of the other cam system so that both cam systems may not operate simultaneously. Therefore, starting with the parts in the position shown and assuming the level to be low, motor 81 should not operate and the switch controlled by cam 106 should remain closed permitting the operation of motor 74 to correct such low level.

It is desired, however, that the control system complete a cycle of operation even though the electrode 36 be exposed but momentarily and even though the level rise subsequent to the starting of the motor 74 and prior to the cams associated therewith completing a whole revolution. For this purpose there is provided a maintaining circuit for the motor 74 to continue the operation of this motor for a complete 360° revolution of its associated cams 101 to 105 inclusive. This maintained circuit may be traced as follows: from line wire 46 through wire 87, contacts 83 and 84 of relay 51, wire 88, contacts 89 and 95 of relay 52, wire 114, switch contacts 113 and 112, wire 111, motor 74, wire 73, switch contacts 75 and 119 of the switch controlled by cam 102 and wire 120 back to line wire 47. As shown, the switch associated with cam 102 will be closed once the motor 74 has started the rotation of its associated cams and will remain closed until these cams have completed a single revolution.

Shortly after the cams 101 to 105 have started their rotation, the switch associated with cam 101 will be opened due to the high point thereof passing out of registry with the movable contact of its associated switch which is spring pressed against this cam thus opening all circuits through motor 81 of the other cam system.

Also shortly after the beginning of the rotation of cams 101 to 105, the high zone of cam 103 will be positioned to close its associated switch connecting contacts 122 and 123. This will operate motor 31 to adjust the rate of supply of material to the furnace in a corrective direction (i. e. increase such rate), the circuit for this purpose being traced out as follows: from line wire 46 through common wire 32 to motor 31, thence through wire 33, switch contacts 123 and 122, wire 124 and wire 125 back to line wire 47. The motor 31 will thus be operated for the period of time required to rotate the cam 103 around almost half a revolution and thus give a relatively large adjustive change in a corrective direction to the rate of supply of material to the furnace.

Subsequent to the completion of this operation of the motor 31 as above set forth and after switch contacts 122 and 123 have been reopened due to the continued rotation of cam 103, the high zone of cam 104 will be brought to a position to close its associated switch for a shorter period of time, thus connecting switch contacts 131 and 132. This will cause the operation of the motor 31 in the reverse direction, but for a shorter period of time. This circuit may be traced as follows: from line wire 46, through common wire 32 to motor 31, thence through wire 34, wire 129, switch contacts 132 and 131, wire 133, and wire 125, back to line wire 47. The revolution of the cams controlled by motor 74 is now substantially completed, and if the level has meanwhile been corrected, no further operations will take place. If not, the cycle will be repeated as above set forth.

Referring now to Fig. 3 and assuming in that figure that time is plotted as abscissæ and rate of material supply to the furnace as ordinates, the portion of the line from $a$ to $b$ shows the rate of supply while the level stays correct, or so nearly so as not to vary the currents through the electrodes 35 to 38 from that existing when the level is correct. At the point $b$ it is assumed that the electrode 36 is exposed due to lowering of the level initiating the operation of the cycle just described. This causes a relatively large increase in the rate of supply of material indicated from the points $b$ to $c$, this being controlled by the cam 103 just described. From $c$ to $d$, the rate remains constant as the motor 31 is permitted to stop, this portion of the cycle corresponding to the time between the opening of the switch associated with cam 103 and the closing of the switch associated with cam 104. From $d$ to $e$, the motor 31 is operating in a reverse direction under the control of the switch associated with cam 104. Due to the high portion of cam 104 being shorter than the high portion of cam 103, the reverse operation of the motor will be less than the initial or corrective operation, so that there will be due to this corrective cycle a permanent change made in the rate of supply of the glass making materials or batch to the furnace, to compensate for the conditions present which caused the level to be lowered. Also from the point $b$ to $e$, a relatively large amount of batch will be supplied greater than that required for continuous operation to make up for the difference in level caused by the lag between the time when the new condition first existed which caused the lowering of the level and the time the control system started to function to correct the level.

Let us consider now the operation of the system should the glass level rise a small amount sufficient to bring it up to the level indicated by the legend "Level high", indicated on the drawings, and thus to connect electrodes 37 with the glass. This will cause exactly the reverse series of operations to that just described. In the first place, relay 50 will be energized to connect contact points 77 and 78. This circuit may be traced as follows: from the line wire 46, through wire 48 to the ground, thence through wire 45 and electrode 44 to the bath, thence through electrode 37 and wire 60 to the solenoid coil 61 of relay 50, and thence through wire 59 to the line wire 47. This will initiate the operation of lower cam motor 81 in a circuit which may be traced as follows: from line wire 46 through wire 87, upper contacts 83 and 84 of relay 51, wire 88, lower contacts 89 and 95 of relay 52, wire 114, wire 118, switch contacts 116 and 115 of the switch controlled by cam 101, which is now closed, wire 117, motor 81, wire 79, contacts 78 and 77 of relay 50 which has now been closed, wire 76, contacts 71 and 70 of relay 49 which is closed, and wire 59 to line wire 47.

Once motor 81 has started its operation, it will be maintained in operation for a complete revolution of its associated cams 106 to 110 by a circuit including switch contacts 82 and 121 controlled by cam 107 in the same manner as described above for the operation of motor 74, these switch contacts shorting the circuit through relay 50 so that from the motor 81, which is supplied with current from the line wire 46 through the path previously described, the circuit may then be traced through wire 80, switch contacts 82 and 121, and wire 120 back to line wire 47.

The initial relatively large corrective change of the rate of supply of material caused by motor 31 is under the control of the switch associated with cam 108. This causes the operation of the motor 31 through a circuit which may be traced as follows: starting with the line wire 46 through common wire 32 to the motor, thence through wire 34, a portion of wire 129, wire 128, switch contacts 127 and 126, and wire 125 back to line wire 47. Subsequent to this large corrective change, there is a change in the reverse direction under the control of cam 109, which has a relatively shorter high portion as above set forth. The circuit for operation of the motor 31 in this reverse direction may be traced as follows: starting with line wire 46, through wire 32 to the motor 31, thence through a part of wire 33, wire 137, switch contacts 135 and 134, wire 136 and wire 125 back to line wire 47. The operation therefore of the adjusting means for the rate when the level is sufficiently high to contact with electrode 37 could be shown on Fig. 3 below the horizontal in the same manner as the line b—c—d—e which illustrates the resulting adjustments when the level is low.

If the level of the bath of glass or other liquid is extremely low, it is desired to effect a correction thereof in a manner more rapid than could be accomplished by a series of steps, each corresponding to the cycle previously described. For this purpose, the electrode 35 is provided which will be uncovered when the level of the bath is sufficiently low. For example, if the level of the bath gets to the point indicated by the legend "Level extra low", electrodes 35 and 36 will both be out of contact with the bath, so that the solenoid coil of relay 49 will be deenergized, as above set forth, and so that any circuit through the solenoid coil of relay 51, which includes electrode 35, will be broken. However, this last relay is normally energized through two paths, only one of which includes electrode 35. The other path may be traced as follows: starting with line wire 46 through wire 141, switch contacts 139 and 138 of the switch controlled by cam 105, wire 140, a portion of wire 53, solenoid coil 54 of relay 51, and wire 55 back to line wire 47. Thus relay 51 will thus remain energized by flow of current through this path except during the portion of the cycle of cams 101 to 105 during which the movable portion of the switch associated with cam 105 can drop into the notch shown in the drawings. This can occur only during the interval between the times that cam 103 is effective to close its associated switch and cam 104 is effective to close its associated switch, or in other words, during the time period in the cycle, referring to Fig. 3, between points c and d. Thus, under these circumstances, the cycle will carry on as previously explained in describing the cycle b—c—d—e (Fig. 3) through the first portion of this cycle as indicated from points f to g which correspond to the previous cycle b—c. When the cam 105 is rotated to the point that its associated switch is open, and if at that time the electrode 35 is uncovered, relay 51 will be deenergized, which will connect contact points 85 and 86. Under these circumstances, the inching motor 142 will be started through a circuit which may be traced as follows: from line wire 46, through wire 147, wire 146, motor 142, wire 91, relay contacts 86 and 85 and wire 90 back to line wire 47. The rotation of motor 142 will rotate the cog-like cam wheel 143 which will intermittently open and close the switch including contacts 92 and 144. Each time this switch is closed, the motor 31 will be operated in a corrective direction through a circuit which may be traced as follows: from line wire 46, through common wire 32 to the motor 31, thence through part of wire 33, wire 145, switch contacts 144 and 92, wire 91, contacts 86 and 85 of relay 51 and wire 90 back to line wire 47. During this period the deenergization of relay 51 will stop the motor 74 which rotates cams 101 to 105 due to breaking contact between points 83 and 84 which are in series with this motor and the line. Thus the intermittent corrective movements of the motor 31 in adjusting the rate of feed of the material to the bath will be continued as long as the electrode 35 remains uncovered and out of contact with the bath. These intermittent corrections are indicated by the stepped line from the point g to the point h (Fig. 3). At the latter point it is assumed that the level of the bath is corrected sufficiently so as again to be in contact with the electrode 35. This causes relay 51 to be energized, as above set forth, the motor 142 to stop, and motor 74 to recommence its operation with the maintained circuit, as above set forth, to complete the cycle which was interrupted in the middle. Thus the line h—i merely represents the completion of the cycle corresponding to the line d—e of the first cycle. The level of the horizontal i—j however is materially above the level of the horizontal e—f due to the large correction made in response to the electrode 35 being out of contact with the bath. Thus, there is a very rapid correction made in the average rate of feed of the material to the bath in response to an extremely low level, correcting the level much more quickly than could be done if only the first described correcting cycle were available.

The other possible condition which must be considered is an extremely high level, higher than would be quickly corrected by the cycle operating in response to contact of the bath with electrode 37. For this purpose, electrode 38 is provided responsive to levels such as that indicated by the legend "Level extra high". Under these circumstances, all the electrodes 35 to 38 will be in contact with the bath. The cycle above described and including the rotation of cams 106 to 110 will then be carried through to a point just after the completion of the corrective operation in response to the cam 108 and prior to the operation in response to the cam 109. This will take place in view of the fact that it is not until this period that the switch including contacts 63 and 64 is closed by the protrusion or high part of the cam 110. When this switch is closed, the solenoid coil of relay 52 will be energized in a circuit which may be traced as follows: starting with line wire 46, through wire 48 to the ground, thence through wire 45 and electrode 44 to the bath, thence through electrode 38, wire 62, switch contacts 63 and 64 which are now closed, wire 65, solenoid coil 66 of relay 52, and wire 67 back to line wire 47. The energization of this relay will first break the circuit previously described through motor 81, causing this motor to stop for the period of time the relay 52 is energized, which condition continues until the electrode 38 is again out of contact with the bath. Also, the energization of relay 52 will complete a circuit through inching motor 98 which may be traced as follows: starting with line wire 46 through wire 147, inching motor 98, wire 97, upper relay contacts 94 and 93 of relay 52 and wire 96 back to line wire 47. This motor will rotate the cog-like cam wheel 144a and thus intermittently open and close its associated switch. This switch will complete a circuit through the rate controlling motor 31 to impart intermittent corrective movements thereto, similar to the movements described above causing the intermittent corrections in the portion of the line from points g to h, Fig. 3. This circuit through the motor 31 may be traced as follows: starting with line wire 46 through common wire 32 to motor 31, thence through wire 34 and a portion of wire 129, switch contacts 130 and 100, wire 99, wire 97, contacts 94 and 93 of relay 52 and wire 96 back to line wire 47. The corrective movements of motor 31 will therefore continue as long as the electrode 38 remains immersed in the bath, after which the relay 52 will be deenergized and the ordinary cycle completed in the manner above described.

The cycle indicated in Fig. 3 and including points j—k—l—m is merely a repetition of cycle b—c—d—e, so that the level m—n may be assumed to be the final corrected rate of supply required to compensate for the condition which caused the lowering of the level of the bath. A corresponding and similarly shaped line could be drawn below the horizontal broken line in Fig. 3, illustrating the possible variations in the rate in response to an undesired high level, responsive for example to a sudden diminution in the rate of withdrawal of glass from the tank.

We have made provisions in connection with our control system for various adjustments, the first of which is illustrated best in Fig. 1, wherein the electrodes 35 to 38 are shown vertically adjustable. This provides first for the manual variation of the point to which the system will correct the level. Also the manual variation of the position of the electrodes may be utilized for the purpose of making the system more or less sensitive, that is to operate upon smaller or larger differences between the desired level and the levels which will initiate a corrective operation of the control system. These adjustments may be effected independently on the inner electrodes for operating the system through a cycle, as illustrated b—c—d—e in Fig. 3, and also through the other cycle as f—g—h—i including the extreme high or low electrodes respectively. In addition the high portions on cams 103, 104, 108 and 109 may be made of adjustably variable length in a manner which is now well known in the art for the purpose of adjustably varying the amount of the initial large corrective change and/or the reverse change taking place thereafter. In addition the gear ratio between the motors 74 and 81 and their respective associated cams may be varied to determine the length of time of the corrective cycle and thus to vary the character of the correction effected by the system when operating through a single cycle. Other possible adjustments will suggest themselves to any one using the system set forth herein. All these adjustments are to be considered within the purview of our invention.

Thus, it will be seen that we have provided a completely automatic control system which will compensate for variations in level of any electrolytic liquid which is being withdrawn from a container wherein the level is desired to be maintained and which is being supplied either with the liquid itself or with material which will form that liquid. In connection with this system, we have provided for the correction of the level by a two-fold compensation. First, a compensation for the lag existing between the time the new condition was first present and the time the level responsive means operates to initiate the correction; and second, to correct the normal or basic rate of supply of material to the bath as required to compensate for the new condition over an extended period of time.

We have also provided additional means responsive to extreme differences between the existing level and that desired for effecting a relatively quicker correction of such extreme differences in level than could be done by the means first described.

It will be understood that many changes may be made in our invention without departing from the spirit thereof and certain details and arrangements of the invention less than the whole may be used independent of the rest. Also the invention may be applied in a large number of different ways, and with different materials, although it is particularly adapted for use with molten glass. We do not wish to be limited therefore except by the scope of the appended claims which are to be construed as broadly as the state of the prior art permits.

We claim:

1. The method of controlling the level of a bath of molten glass in a container for the same in response to variations in said level, which bath is being drawn off at rates which may vary from time to time and to which materials to augment the bath are substantially continuously being supplied, comprising the steps of varying the rate of supply of said material to the bath in a corrective direction and in a manner such as first to compensate for the difference between the actual level which initiates the level regulation and the desired level, and second so regulating the rate of supply of said material as to compensate for the difference between the rate of material supply to the bath prior to the existence of the condition causing the level to change from the desired point and the new rate at which material must be supplied in order to maintain the level under the new conditions.

2. Apparatus for automatically controlling the level of a bath of an electrolytic liquid which is being drawn off at rates which may vary from time to time and which is provided with means for substantially continuously supplying thereto material to augment the bath, comprising means for automatically and adjustably varying the rate of supply of said material to the bath, a pair of electrodes permanently positioned with respect to the bath one terminating slightly above the desired level for the bath and the other slightly below such level, an electric current supply having one terminal grounded to said bath so that when the level thereof is at the desired point, the lower of said electrodes receives current therefrom and the upper of said electrodes receives no current therefrom, and an automatic electrical control system associated with said electrodes and arranged to be initiated only by the relation of the level of the bath in respect to said electrodes automatically to control the rate of supply of said material in response to variations in such level and to operate once it has been initiated in a complete cycle in which said rate is first varied in a corrective direction by a relatively large amount and thereafter said rate is varied in the reverse direction by a predetermined amount, whereby to counteract the effect of the level change obtained in said bath prior to the initiation of the automatic correcting means.

3. Apparatus for automatically controlling the level of a bath of an electrolytic liquid, which is being drawn off at rates which may vary from time to time and which is provided with means for substantially continuously supplying thereto material to augment the bath, comprising means for automatically and adjustably varying the rate of supply of said material, a pair of electrodes permanently positioned with respect to the bath one terminating slightly above the desired level for the bath and the other slightly below such level, an electric current supply having one terminal grounded to said bath so that when the level thereof is at the desired point, the lower of said electrodes receives current therefrom and the upper of said electrodes received no current therefrom, and an automatic electric control system associated with said electrodes and arranged to be initiated only by the relation of the level of the bath in respect to said electrodes automatically to control the rate of supply of said material in response to variations in such level and to operate once it has been initiated in a complete cycle in which said rate is first varied in a corrective direction by a relatively large amount and thereafter said rate is varied in the reverse direction by a predetermined amount smaller than the amount of the first-named variation, whereby to cause a quick corrective change in said level to bring it back quickly to the desired point, and whereby to effect a variation in said rate subsequent to the completion of the cycle of the correcting means tending to compensate for the condition which caused the level to vary from the desired point.

4. Apparatus according to claim 2 in which at least one of said electrodes is manually vertically adjustable for providing a manual adjustment of the desired level to adapt the system to the control of level of the bath wherein different levels are desired to be maintained from time to time.

5. Apparatus according to claim 2 in which at least one of said electrodes is manually vertically adjustable to provide a desired range wherein the level may vary without initiating the operation of the control system.

6. Apparatus for automatically controlling the level of a bath of an electrolytic liqu'd which is being drawn off at rates which may vary from time to time and which is provided with means for substantially continuously supplying thereto material to augment the bath, comprising means for automatically and adjustably varying the rate of supply of said material to the bath, a pair of electrodes permanently positioned with respect to the bath, one terminating slightly above the desired level for the bath and the other slightly below such level, an electric current supply having one terminal grounded to said bath so that when the level thereof is at the desired point, the lower of said electrodes receives current therefrom and the upper of said electrodes receives no current therefrom, and an automatic electrical control system associated with sa'd electrodes and arranged to be initiated only by the relation of the level of the bath in respect to said electrodes automatically to control the rate of supply of said material in response to variations in such level, such system including a pair of relays, the windings of which are connected respectively to said electrodes, a pair of motor operated cam systems arranged to be operated in response to said relays respectively and each constructed and arranged to move through a complete revolution in response to a change in the current flow through said electrodes, means associated with the motors of each of said cam systems for causing the cams of the systems respectively to complete a revolution irrespective of the position of said relays once the operation of the cam systems has been initiated, a cam in each of said cam systems for causing a large corrective change in said rate of supply of said materials, and another cam in each of said cam systems operative after the first cam has completed its operation to cause a change in said rate smaller than the initial change and in the reverse direction, whereby said rate is varied in a manner to compensate for a change in the level of the bath obtained prior to the operation of the control system and further the mean rate of supply of said material is changed due to a complete cycle of operation of the control system to compensate for the condition causing such level to change.

7. Apparatus for automatical'y controlling the level of a bath of an electrolytic liqu:d which is being drawn off at rates which may vary from time to time and which is provided with means for substantial'y continuously supplying thereto material to augment the bath, comprising means for automatically and adjustably varying the rate of supply of said material to the bath, a series of four electrodes permanently positioned with respect to sa'd bath and term'nating at progressively different levels, two of said electrodes being above the desired level for said bath and normally out of contact therewith and two below such level and normally in contact therewith, an electric current supply having one terminal grounded to said bath so as to pass current to any electrodes in contact with said bath, and an automatic electrical control system associated with said electrodes and so arranged that variations in the current passing to said electrodes from said bath in response to the intermediate pair of said electrodes will initiate a cycle of adjustment of the rate of supply of said material including an adjustment of said rate in a corrective direction by a relatively large amount followed by a smaller adjustment of said rate in the reverse direction, and means associated with said e'ectrical control system and with the highest and lowest of said electrodes responsive to relatively larger variations in the level of said bath for causing the mean rate of supply of said material to be changed in a corrective direction to a greater net amount between the initiation and completion of a cycle of operation of the control system substantially in proportion to the time the level is such as to vary the current through the highest or lowest electrodes.

8. Apparatus for automatically controlling the level of a bath of an electrolytic liquid which is being drawn off at rates which may vary from time to time and which is provided with means for substantially continuously supplying thereto material to augment the bath, comprising means for automatically and adjustably varying the rate of supply of said material to the bath, a series of four electrodes permanently positioned with respect to the bath and terminating at progressively different levels, two of said electrodes terminating above the desired level for the bath and being normally out of contact therewith and the other two terminating below such desired level and being normally in contact therewith, an electric current supply having one terminal grounded to said bath so as to pass current to any electrodes in contact therewith, an automatic electrical control system responsive to predetermined relatively small variation in the level of said bath such as will affect the current passing through one or the other of the intermediate two electrodes for adjusting the rate of supply of said material and including means for causing a complete corrective cycle including an automatic variation of said rate in response to such a relatively small variation in the level by a relatively large amount in a corrective direction followed by an automatic adjustment of said rate in the reverse direction by an amount smaller than the amount of the first-named adjustment, and other means including the uppermost and lowermost of said electrodes responsive to relatively larger variations in the level of said bath from its desired level for making a further change in said rate of supply of said material in a corrective direction by interrupting said cycle intermediate the initial large corrective change made by the aforesaid means and the adjustment in the reverse direction, and during such interruption causing a corrective change in said rate substantially proportionate to the time the level of the bath is such as to affect the current flow through the highest or lowest electrodes, and the system being so constructed and arranged that the amount of change in said rate in such reverse direction subsequent to the interruption is the same independent of the change in said rate made in response to current variation through the highest or lowest of said electrodes, whereby quickly to bring the level of said bath back to the desired point, and whereby quickly to adjust the rate of supply of said material to the new conditions causing variations of the level from its desired point.

9. Apparatus for automatically controlling the level of a bath of electrolytic liquid which is being drawn off at rates which may vary from time to time and which is provided with means for substantially continuously supplying thereto material to augment the bath, comprising means for automatically and adjustably varying the rate of supply of said material to the bath, a series of four electrodes permanently but adjustably positioned with respect to the bath and terminating at progressively different levels, two of said electrodes terminating above the desired level for the bath and being normally out of contact therewith, and the remaining two below the desired level of the bath and normally in contact therewith, an electric current supply having one terminal grounded to said bath so that when the level thereof is at the desired point, current will be supplied through the bath to the two electrodes normally in contact therewith and not to the other two, a pair of relays associated with the intermediate two electrodes which terminate closest to the desired level for the bath, motor operated cam systems associated with said relays respectively and each including a series of cams adapted to be rotated by a motor, one of said cam systems for increasing the rate of supply of said material to the bath and the other decreasing such rate, means associated with each of said cam systems for preventing simultaneous operation of both cam systems, means associated with each of said cam systems for insuring that the motor thereof will complete a revolution of its associated cams once such revolution is started, a pair of cams associated with each system for causing during a single complete rotation of the cam system, first a relatively large change in said rate in a corrective direction under control of one cam and thereafter for causing a predetermined smaller change in said rate in the reverse direction under control of the other cam, a further cam associated with each of said cam systems and operating in response to variation of the current through the highest or lowest terminating electrodes respectively for initiating the operation of a motor operated inching control for causing a further change in said rate in a corrective direction for the period of time such extreme highest or lowest electrodes are affected by said level and intermediate the operation of the two cams which cause the initial relatively large change in the corrective direction and the change in the reverse direction, whereby upon a relatively small change in said level there is initiated and carried through a correction in said rate to compensate for the lag in the initiation of the operation of the automatic control system and a further corrective change in said rate remaining after the completion of the operation of the system through a complete cycle to compensate for the causes of the change in level, and whereby large variations in said level from the desired point will be effective to cause more rapid and relatively larger net corrections in the rate substantially in proportion to the period of time such large variations in the level from the desired point exist.

HAROLD A. WADMAN.
HAROLD W. McINTOSH.